United States Patent
Mochizuki et al.

(10) Patent No.: US 7,882,756 B2
(45) Date of Patent: Feb. 8, 2011

(54) SHIFT ACTUATOR, VEHICLE HAVING THE SAME, AND METHOD FOR MOUNTING SHIFT ACTUATOR

(75) Inventors: Kan Mochizuki, Shizuoka (JP); Takaaki Imamura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 891 days.

(21) Appl. No.: 11/616,105

(22) Filed: Dec. 26, 2006

(65) Prior Publication Data

US 2007/0144285 A1 Jun. 28, 2007

(30) Foreign Application Priority Data

Dec. 28, 2005 (JP) ............................. 2005-377288
Jul. 31, 2006 (JP) ............................. 2006-208046

(51) Int. Cl.
*F16H 59/00* (2006.01)
(52) U.S. Cl. ....................................... 74/335; 74/337.5
(58) Field of Classification Search .................. 74/335, 74/337.5
See application file for complete search history.

(56) References Cited

U.S. PATENT DOCUMENTS 5,881,853 A * 3/1999 Peuster et al. .............. 192/3.56
6,085,607 A * 7/2000 Narita et al. ................... 74/335
7,533,752 B2 * 5/2009 Mochizuki et al. .......... 180/219
7,575,083 B2 * 8/2009 Kosugi et al. ............... 180/219
2005/0081670 A1 * 4/2005 Kozu et al. ................. 74/473.1

FOREIGN PATENT DOCUMENTS

JP 2003-320861 11/2003

\* cited by examiner

Primary Examiner—David D Le
Assistant Examiner—Derek D Knight
(74) Attorney, Agent, or Firm—Keating & Bennett, LLP

(57) ABSTRACT

A shift actuator disposed outside a power unit that is easily positioned in the neutral position during mounting. A motorcycle equipped with a shift actuator includes a transmission; a shift shaft for changing the gears of the transmission; and a crankcase that covers the shift shaft and the transmission. The shift actuator includes a motor; an output shaft connected to the shift shaft with a connecting device therebetween; a worm gear interposed between the motor and the output shaft; a case supporting the motor, the output shaft, and the worm gear; and a potentiometer supported by the case and sensing the position of the output shaft. The worm gear transfers a driving force from the motor to the output shaft but transfers no driving force from the output shaft to the motor.

19 Claims, 18 Drawing Sheets

[Fig. 1]
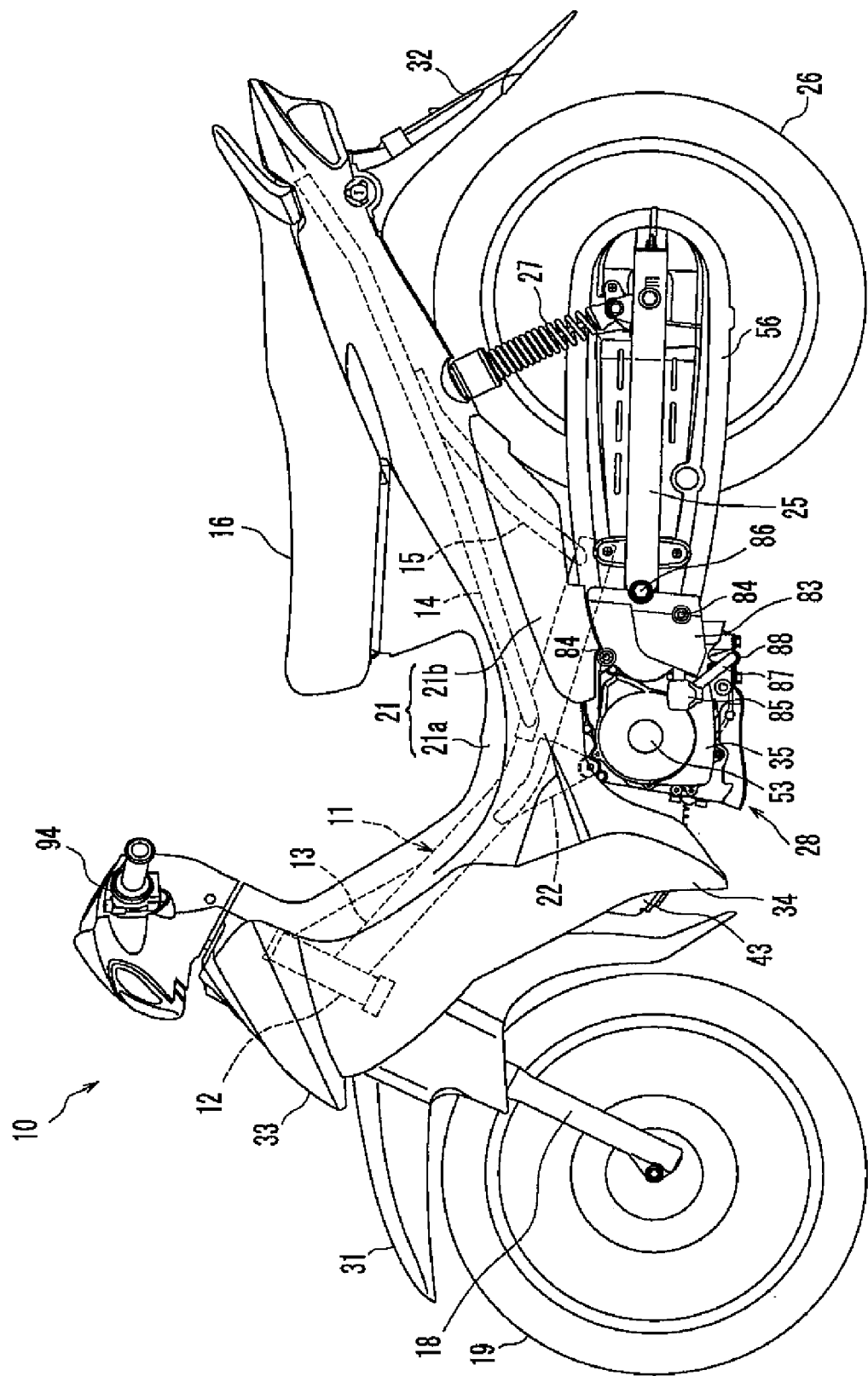

[Fig. 2]
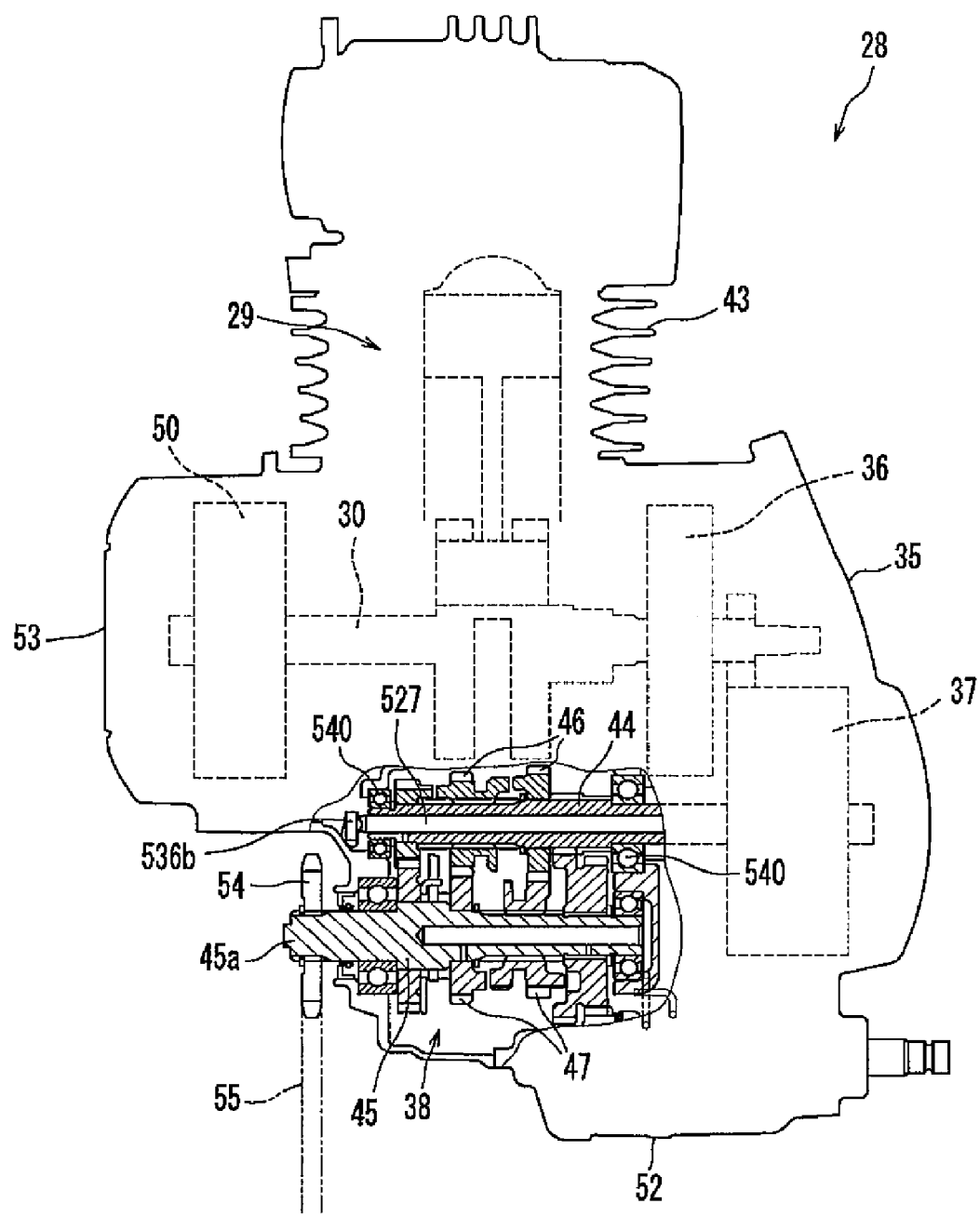

[Fig. 3]
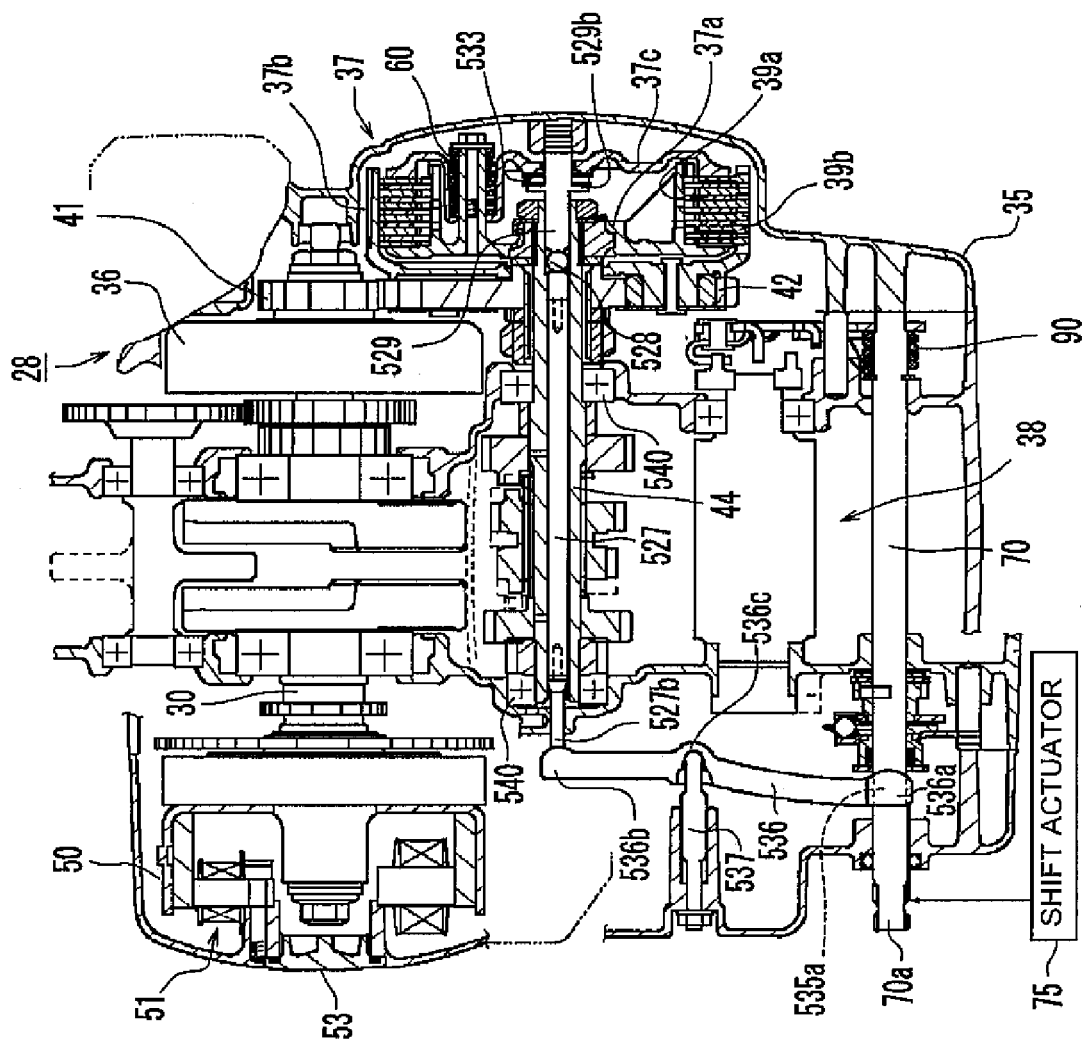

[Fig. 4]
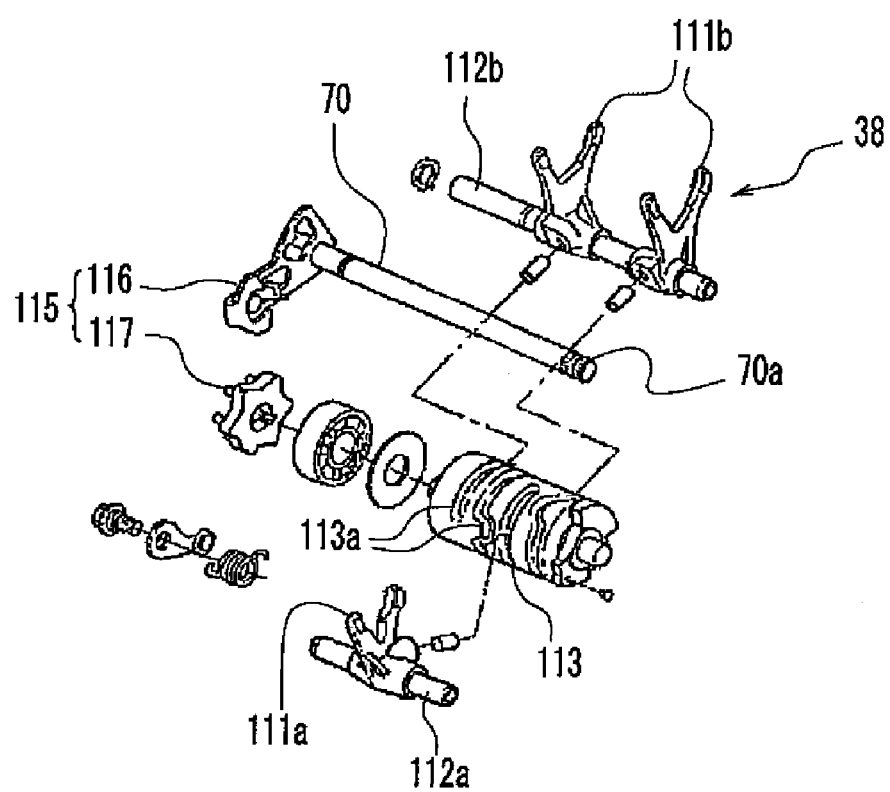

[Fig. 5]
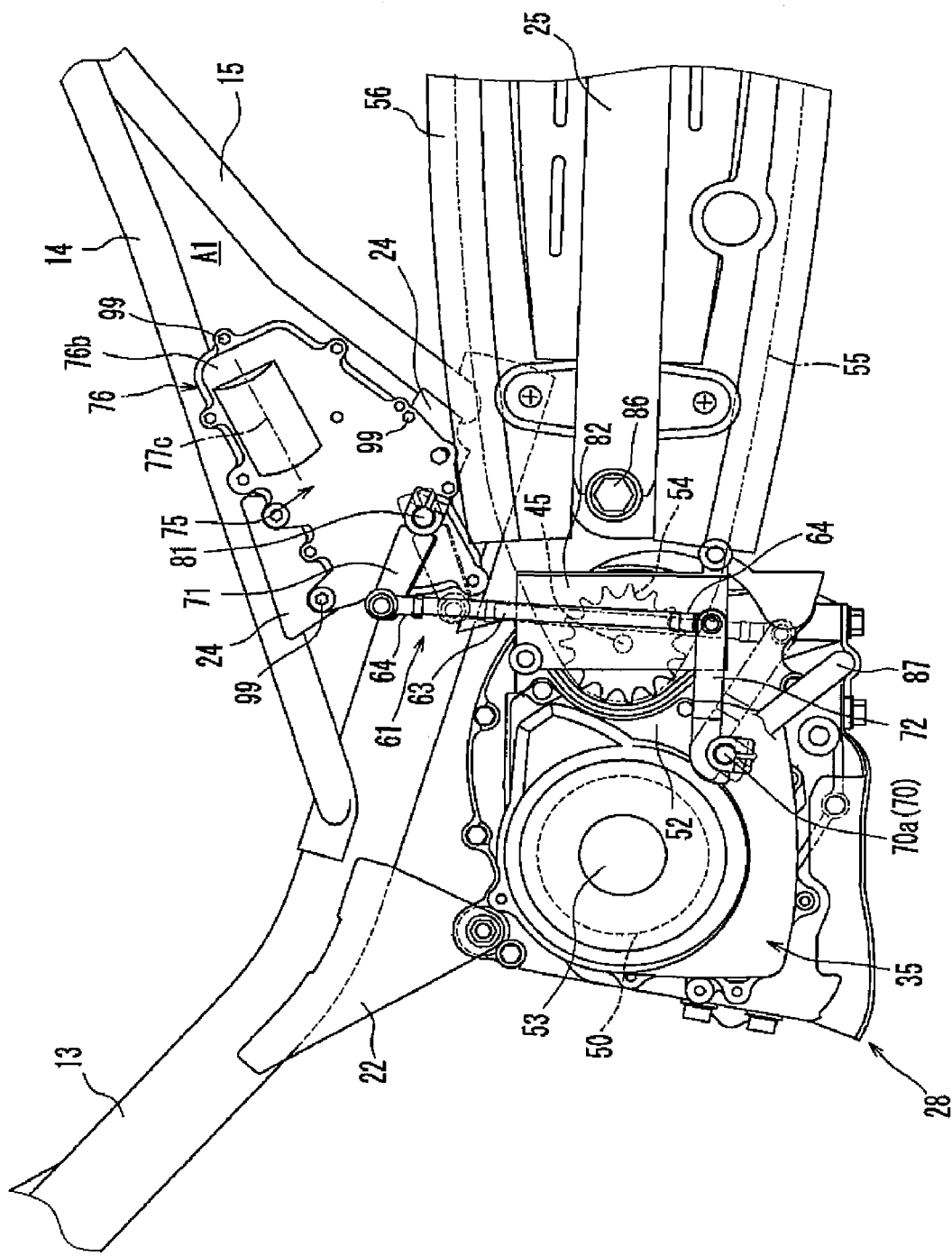

[Fig. 6]
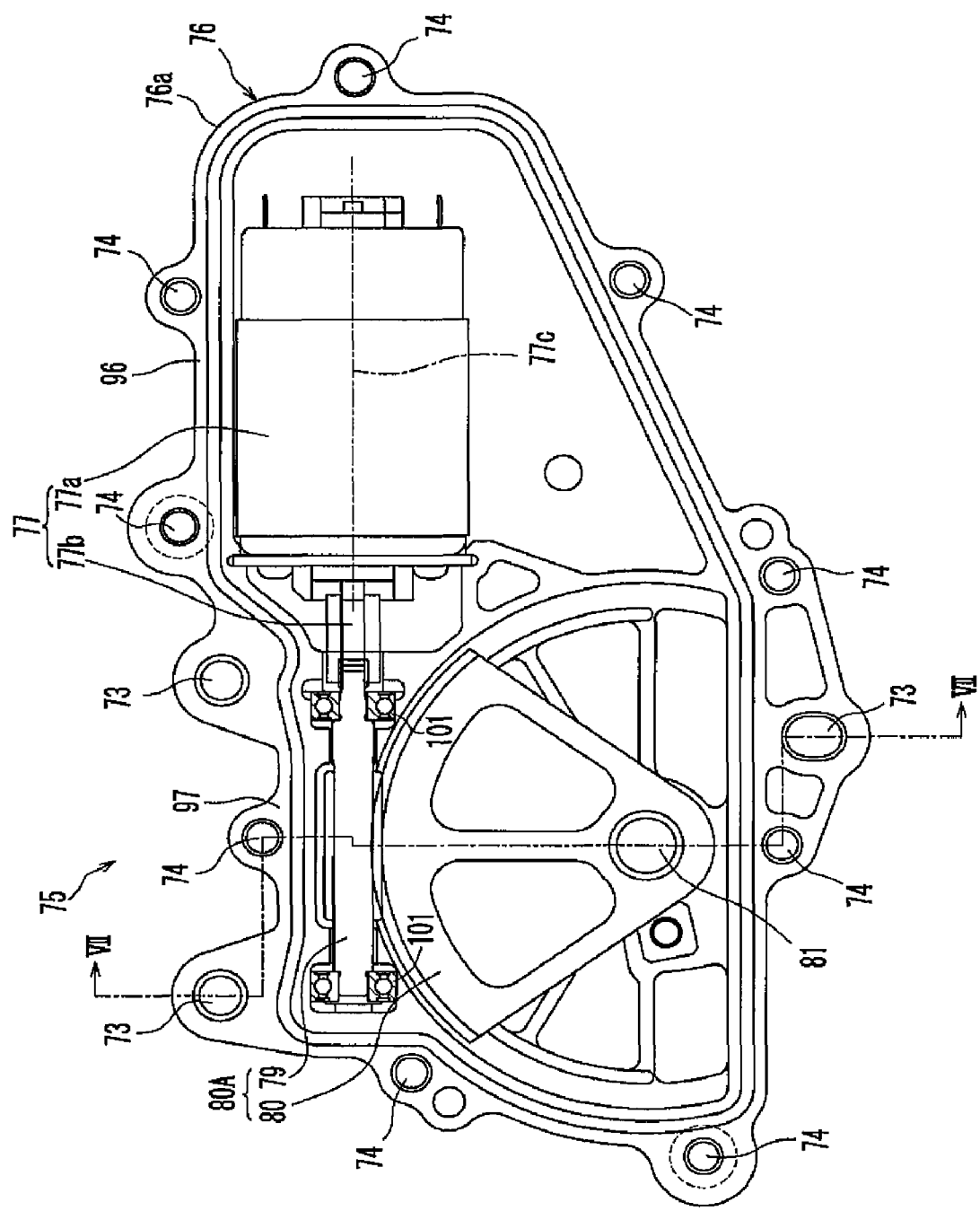

[Fig. 7]
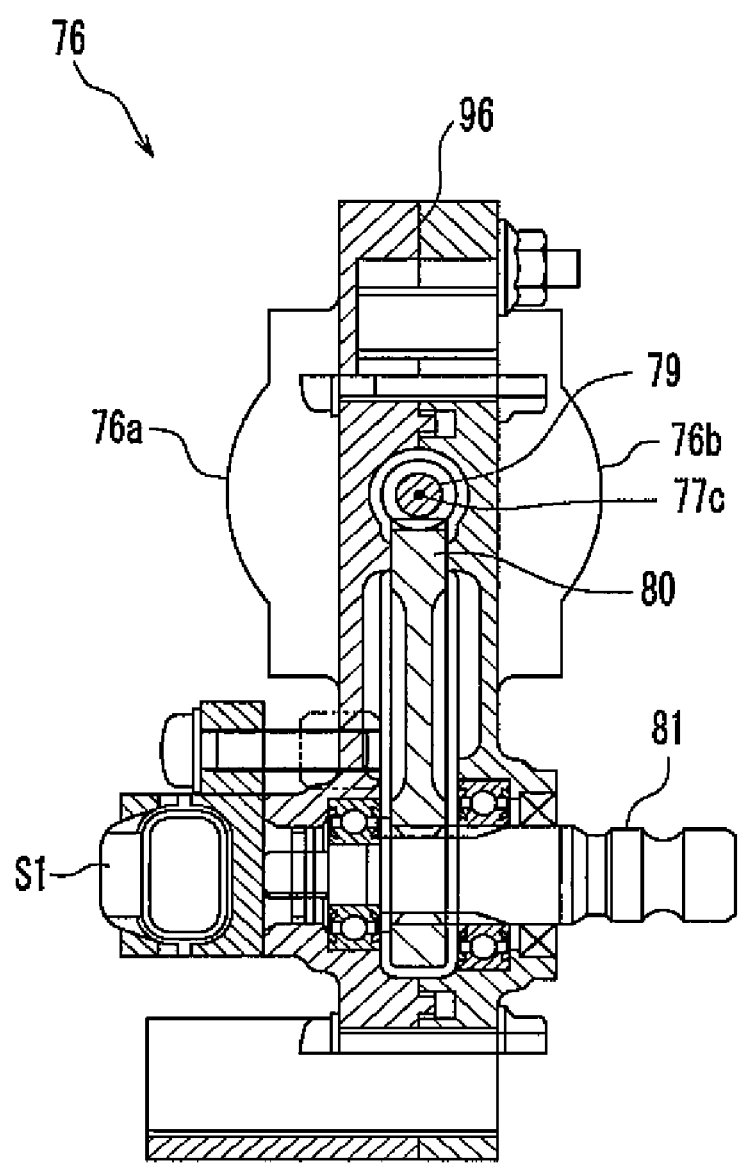

[Fig. 8]
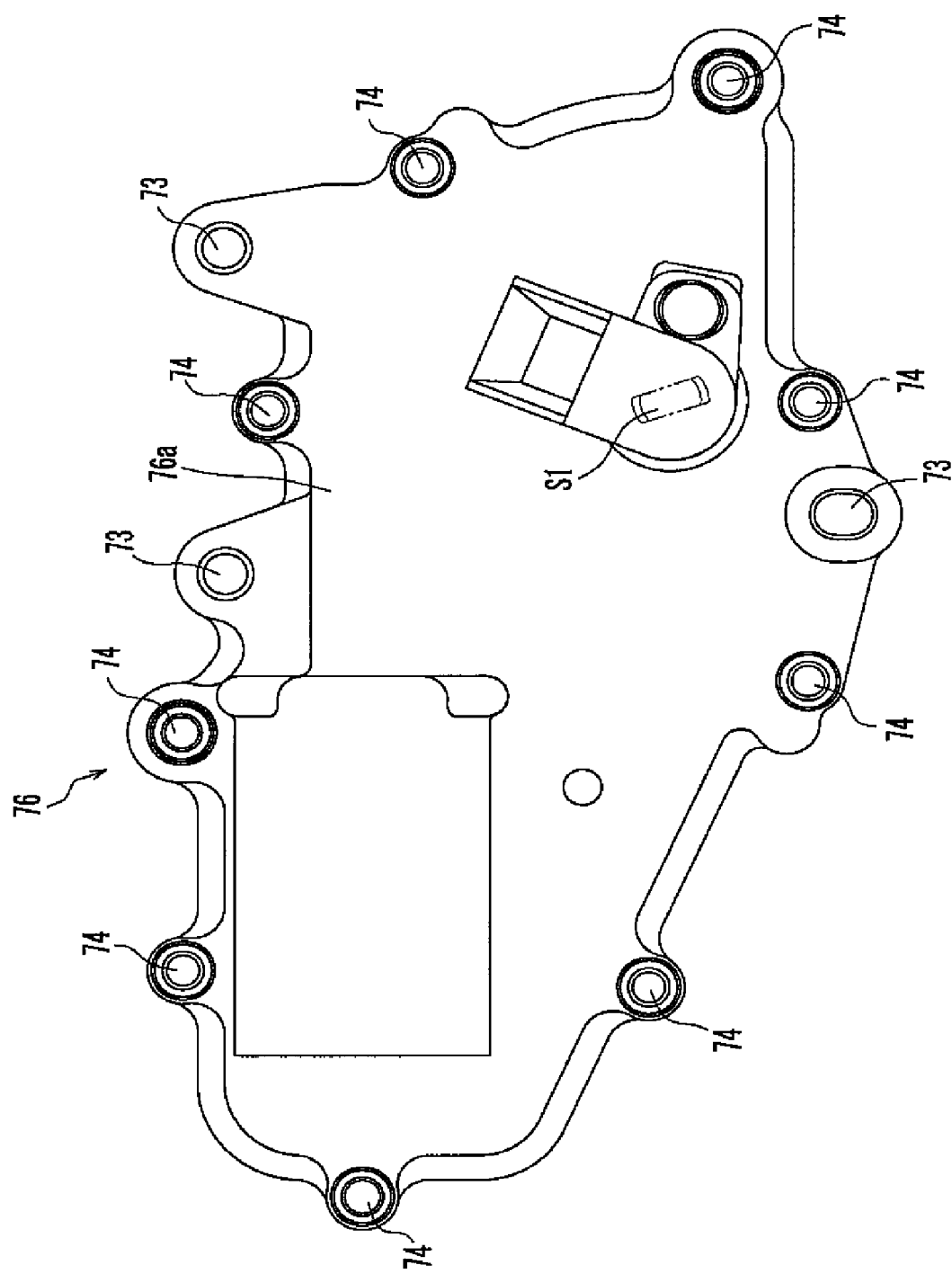

[Fig. 9]
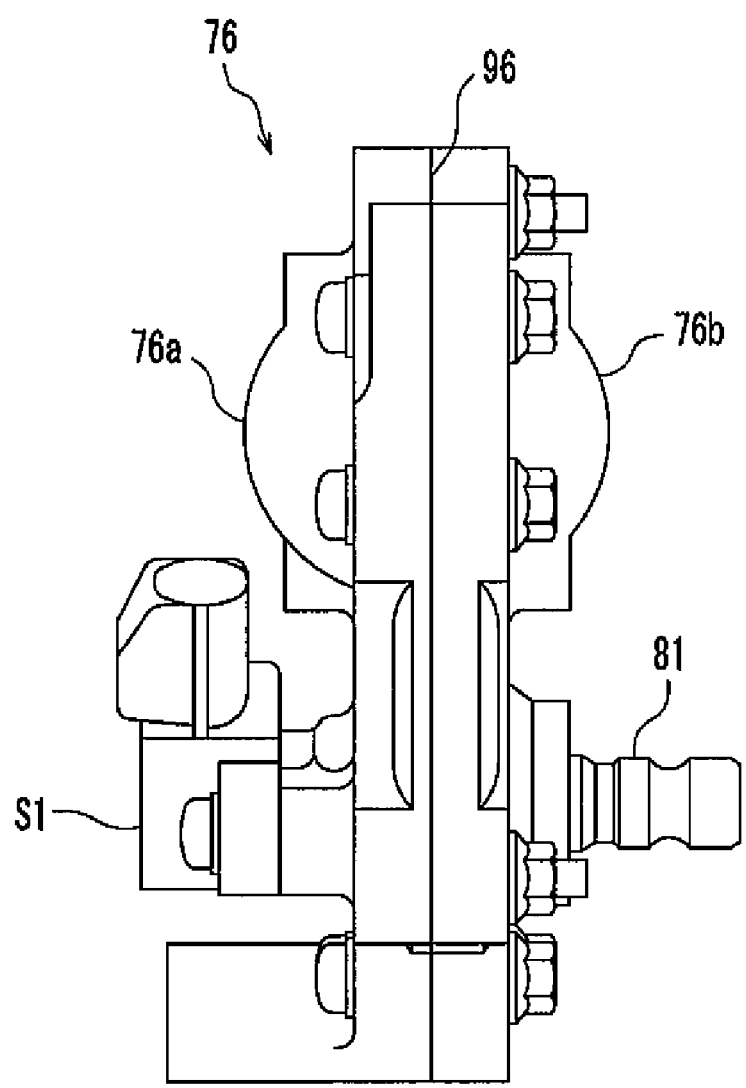

[Fig. 10]
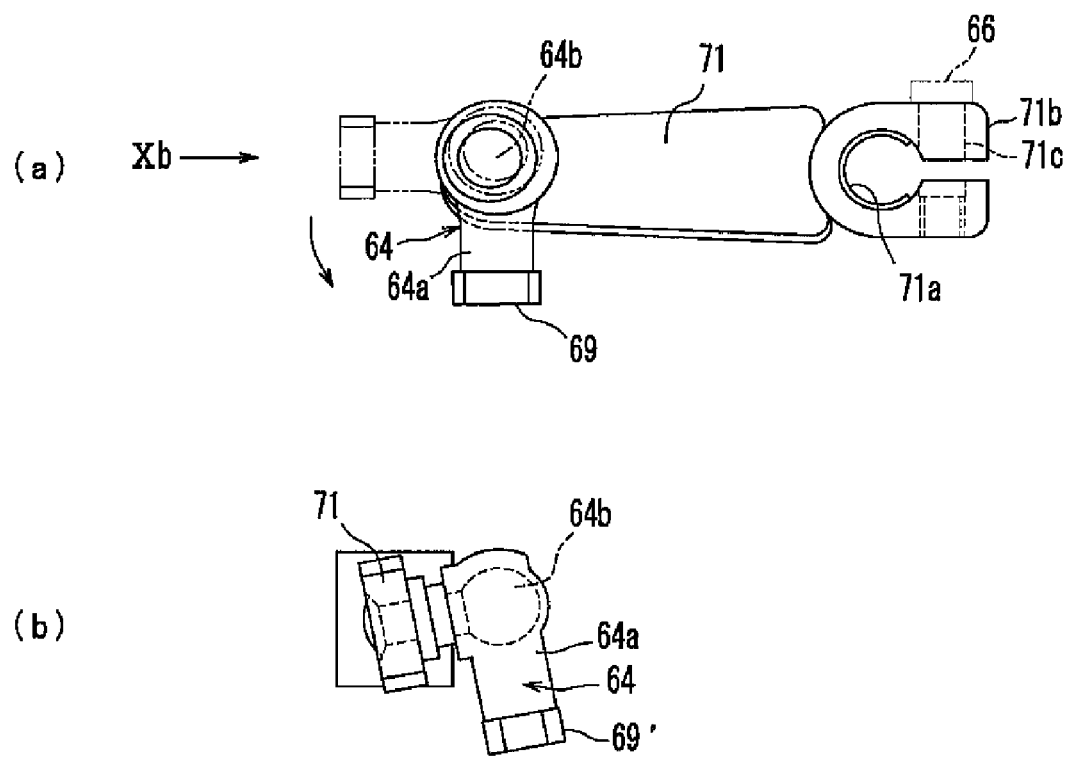

[Fig. 11]
(a) 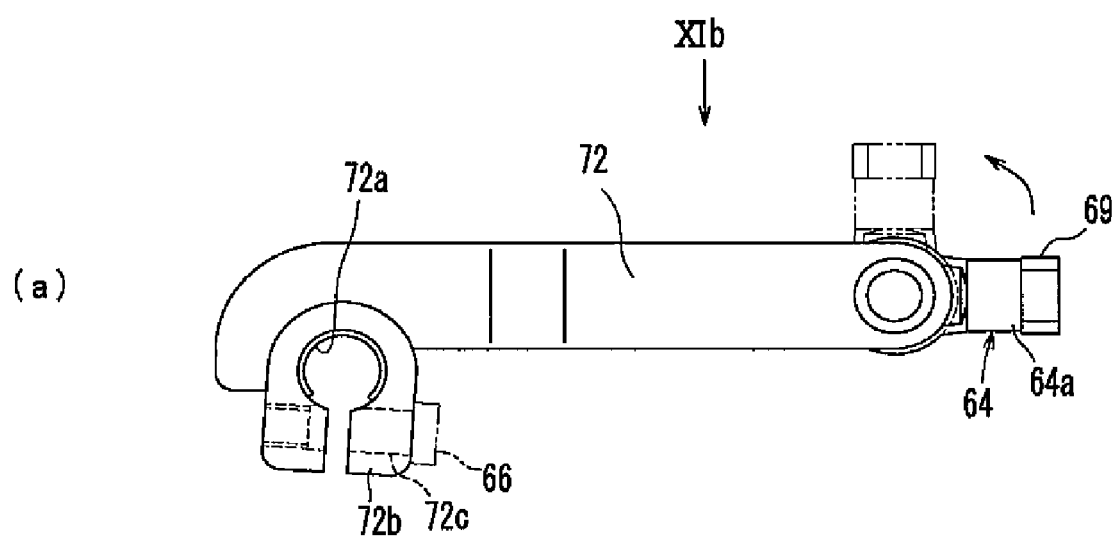
(b) 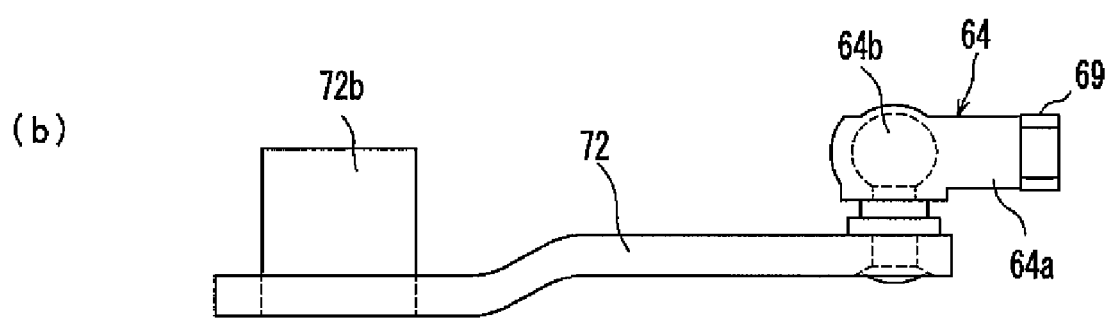

[Fig. 12]
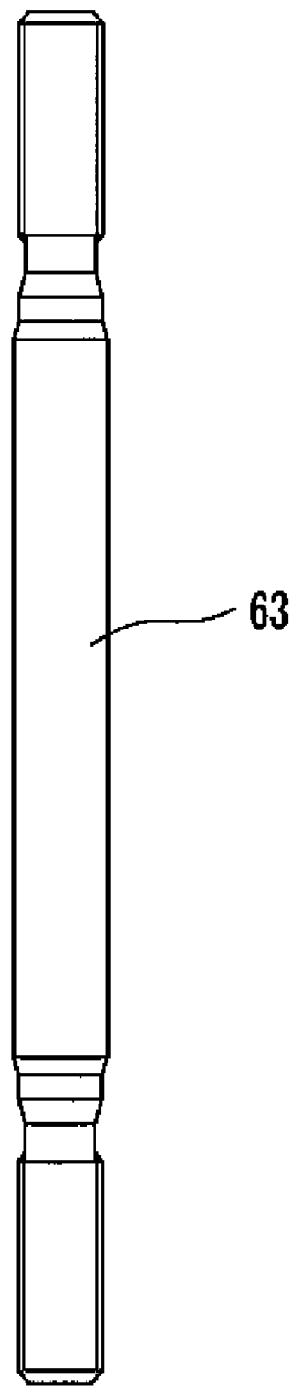

[Fig. 13]
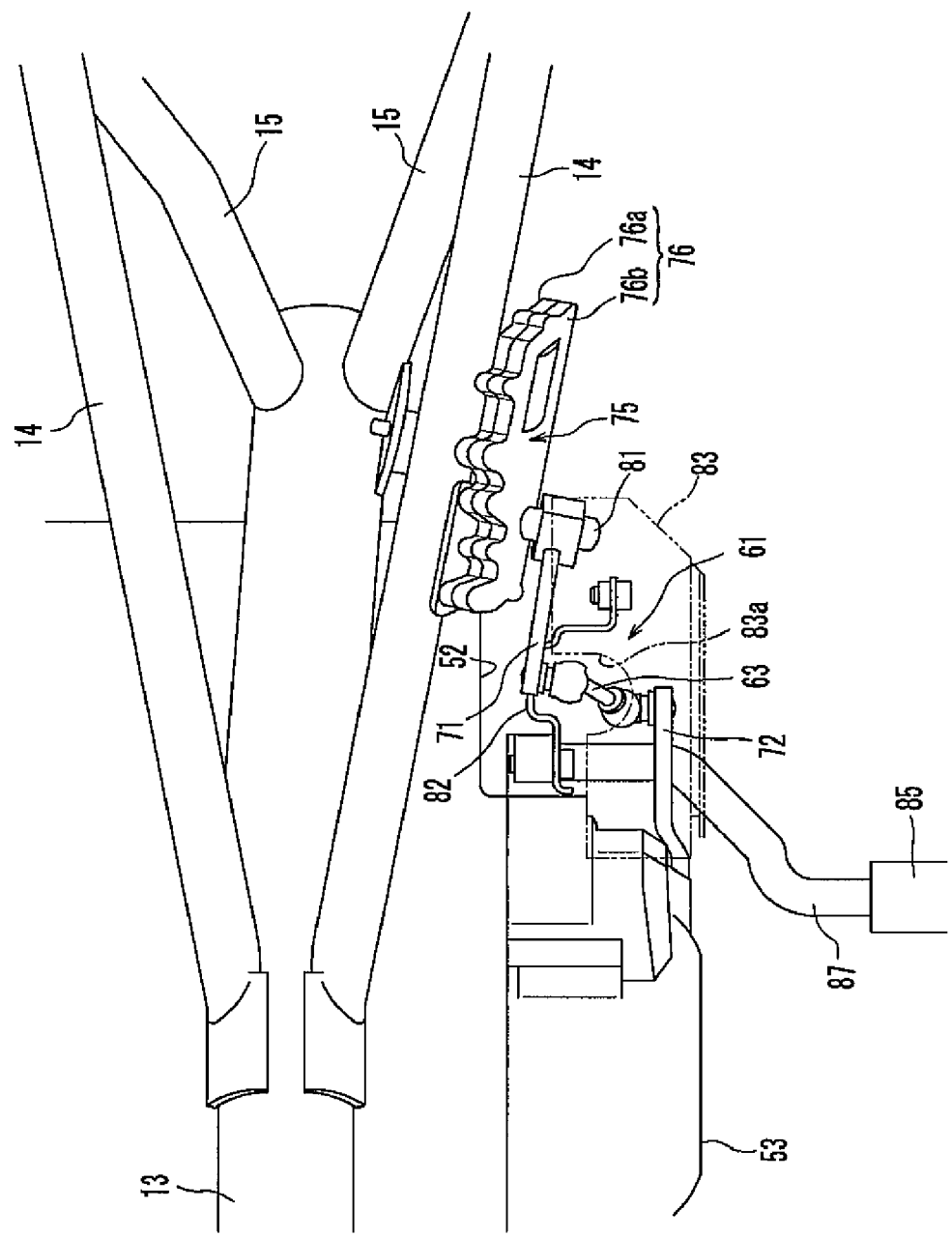

[Fig. 14]
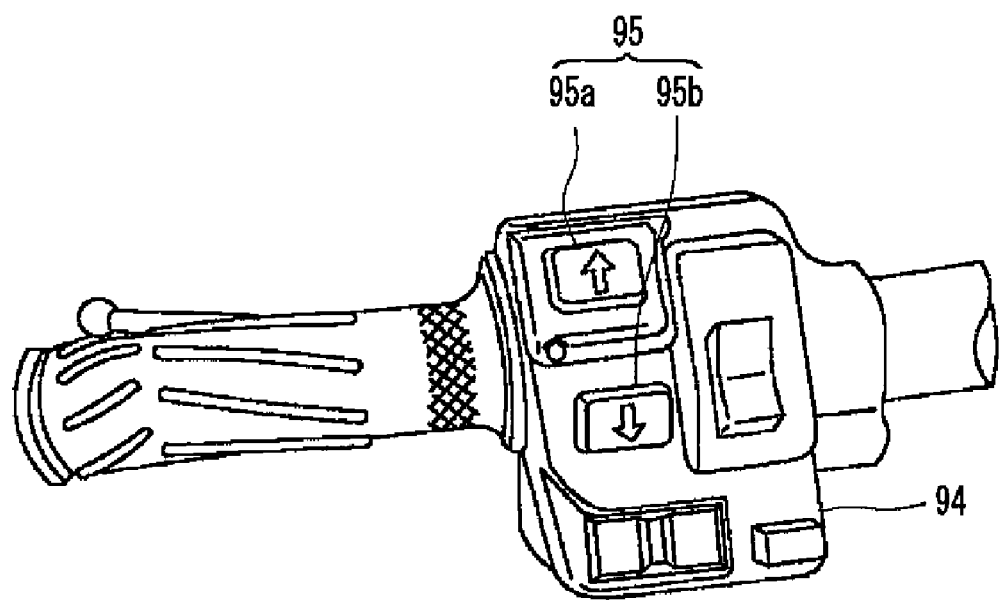

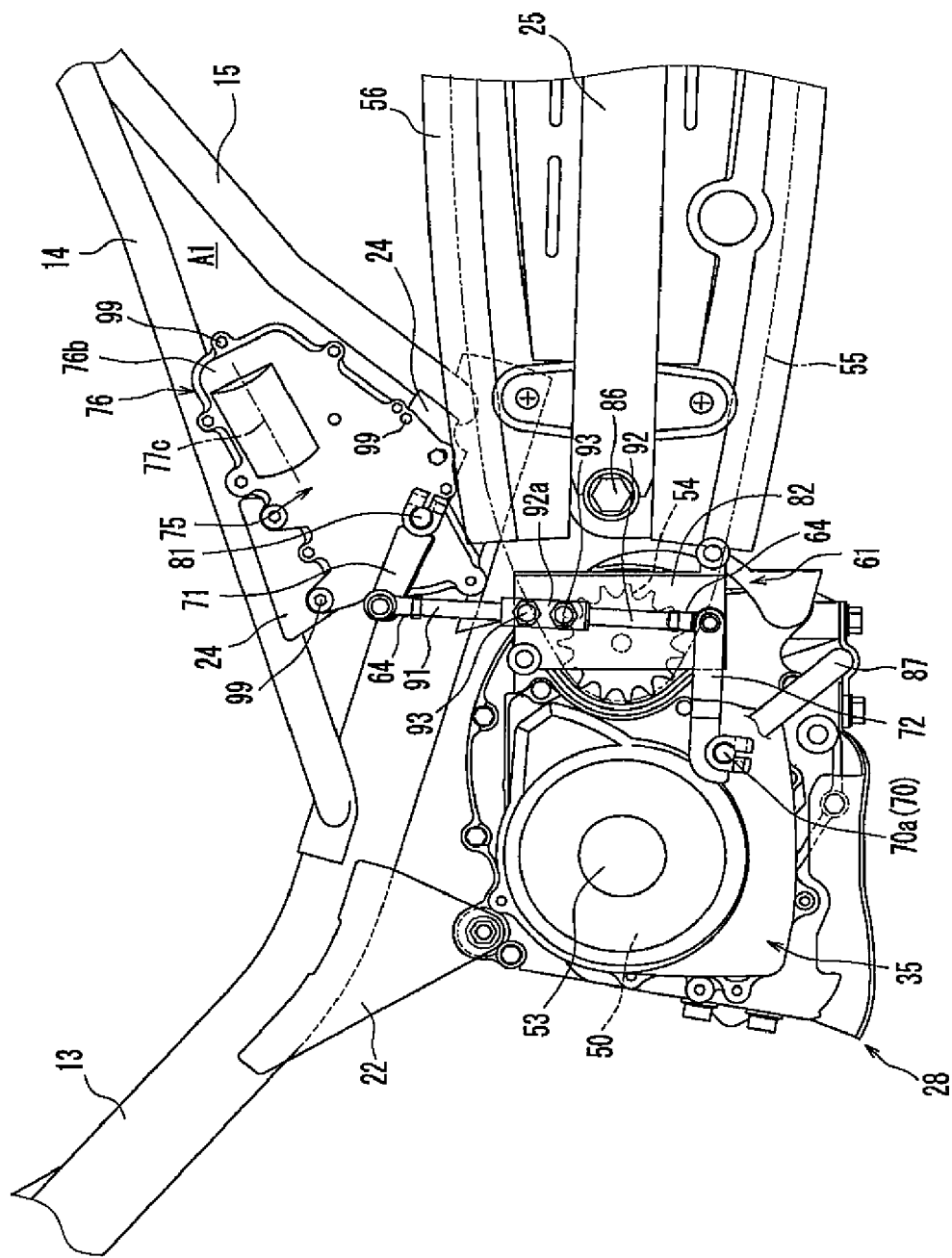
[Fig. 15]

[Fig. 16]
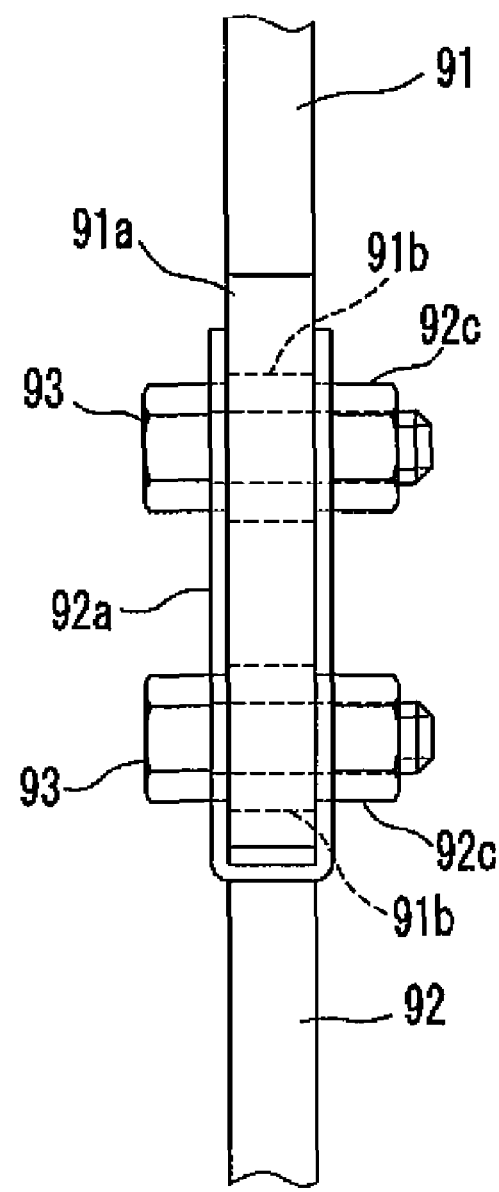

[Fig. 17]
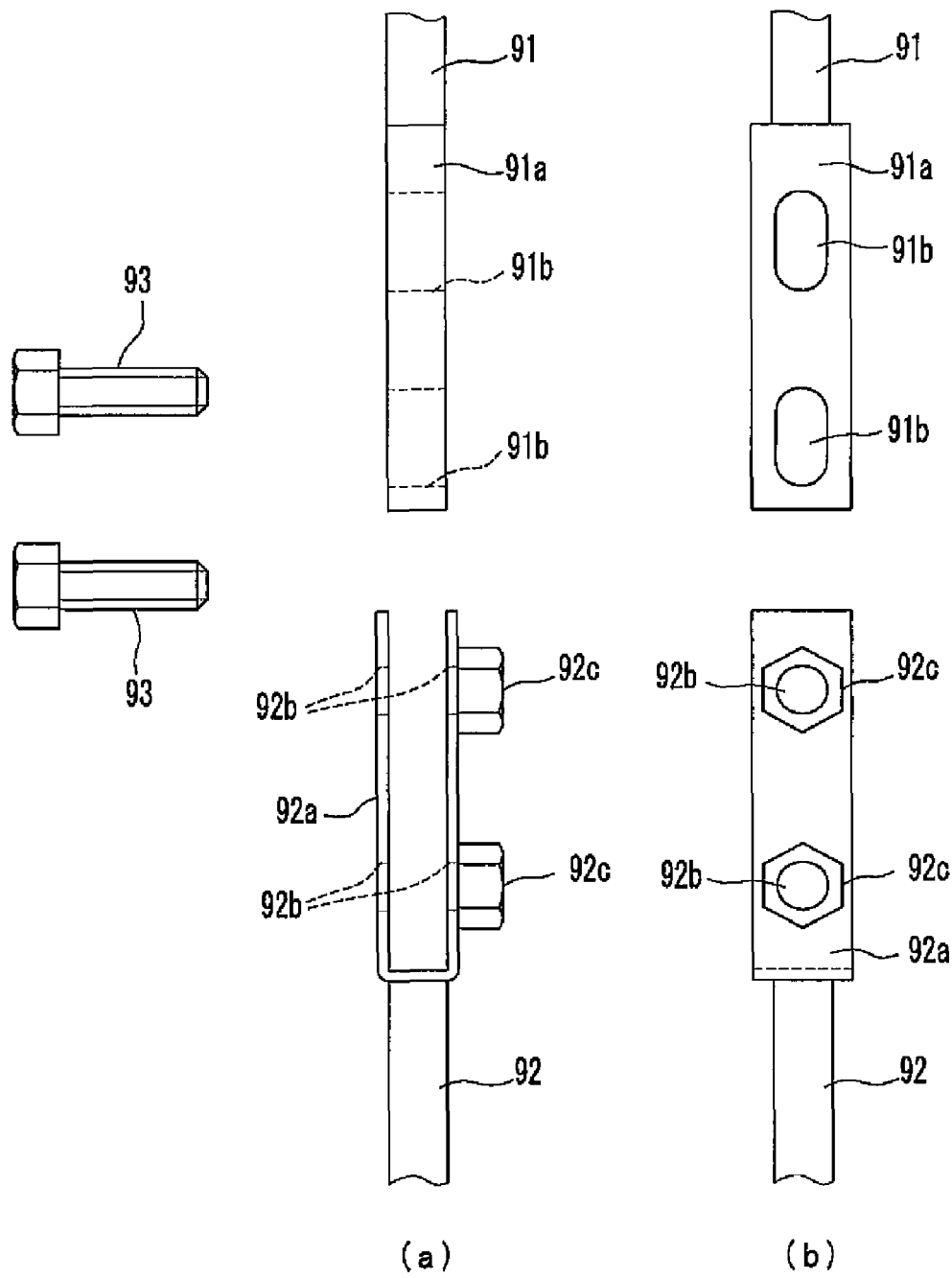

[Fig. 18]
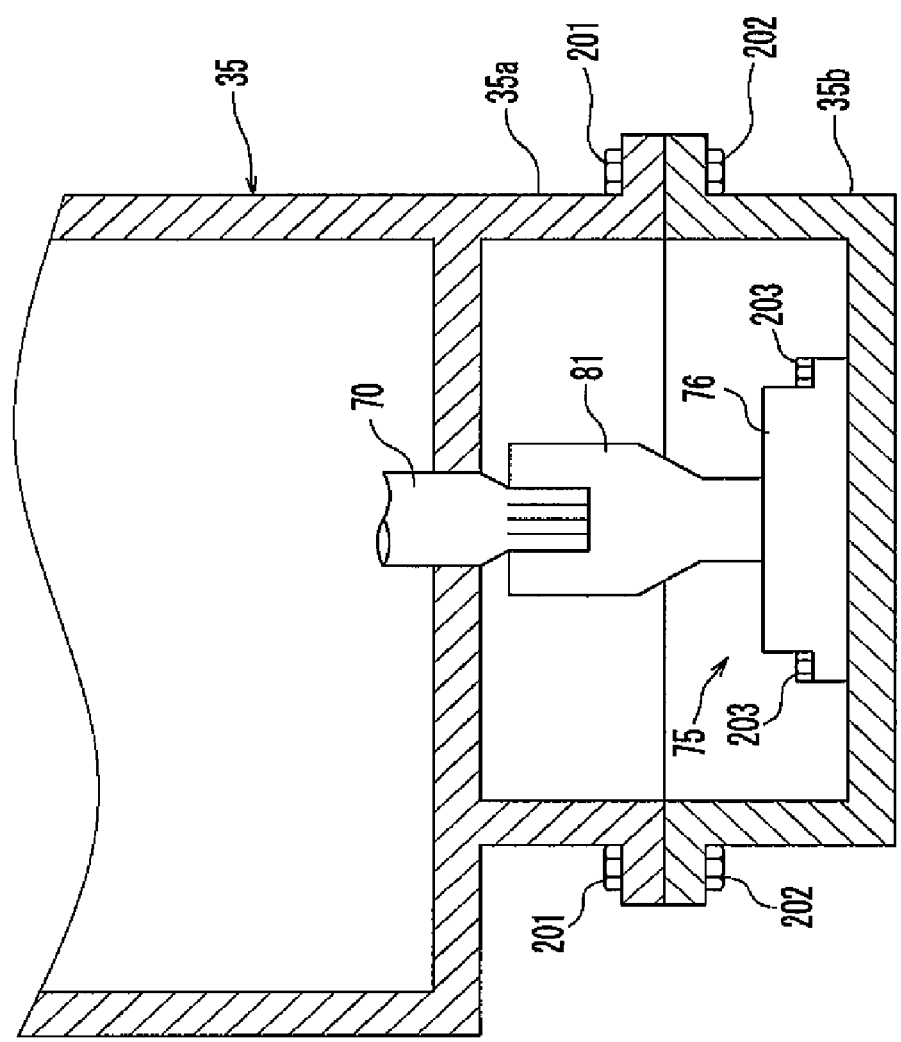

SHIFT ACTUATOR, VEHICLE HAVING THE SAME, AND METHOD FOR MOUNTING SHIFT ACTUATOR

RELATED APPLICATIONS

This application claims the benefit of priority under 35 USC 119 of Japanese patent application No. 2005-377288, filed on Dec. 28, 2005, and Japanese patent application No. 2006-208046, filed on Jul. 31, 2006, which applications are hereby incorporated by reference in their entireties.

BACKGROUND OF THE INVENTION

1. Field of the Invention

The present invention relates to a shift actuator for shifting the gears of a transmission and a method for mounting the shift actuator.

2. Description of Related Art

A vehicle equipped with a transmission and a shift actuator, in which the gears of the transmission are automatically changed, is known in the art (for example, refer to JP-A-2003-320861).

JP-A-2003-320861 discloses a transmission and engine in an engine (power) unit, and a shift actuator outside the engine unit. The shift actuator is connected to the transmission via a link mechanism composed of a rod and a lever.

When the shift actuator is disposed outside the engine unit, the versatility of installation of the shift actuator is increased, and limitations to the layout of the vehicle are reduced. Moreover, since the shift actuator is disposed in the space of the vehicle, the size of the vehicle can be decreased.

There is a problem, however, in that shift-actuator mounting accuracy must be sufficiently high because the shift actuator and a shift shaft of the transmission in the engine unit must be connected with the link mechanism.

Moreover, the shift shaft rotates not in one direction but in two directions of shifting to high gears and low gears. Accordingly, to perform a gear-shift operation correctly, the shift actuator must be held in a correct neutral position before operation. However, JP-A-2003-320861 offers no concrete propositions for ensuring the neutral position of the shift actuator.

SUMMARY OF THE INVENTION

The present invention has been made in light of such circumstances and provides a shift actuator disposed outside a power unit that can easily be positioned in the neutral position during mounting.

A shift actuator according to the invention is mounted to a vehicle equipped with a power unit including a transmission having a plurality of gears, a shift shaft for changing the gears of the transmission, and a casing that covers the shift shaft and the transmission in such a manner as to expose part of the shift shaft externally. The shift actuator comprises: a primary drive; an output shaft connected directly or indirectly to the exposed portion of the shift shaft; a power transfer mechanism interposed between the primary drive and the output shaft, the power transfer mechanism transferring a driving force from the primary drive to the output shaft and transferring no driving force from the output shaft to the primary drive; a housing that supports the primary drive, the output shaft, and the power transfer mechanism; and a position sensor supported by the housing and sensing the position of the output shaft.

The "shift shaft" here is not limited to a single member but may be a combination of a plurality of members. Accordingly, "the exposed portion of the shift shaft" may be varied in form. For example, part of a single shift shaft may project from the casing to form the exposed portion of the shift shaft. Alternatively, the shift shaft may include a main body disposed in the casing and a projecting portion connected to the main body and projecting out of the casing, and the projecting portion may be the exposed portion of the shift shaft. The portions that can be connected from the outside of the casing are included in "the exposed portion of the shift shaft".

A method for mounting the shift actuator to a vehicle comprises the steps of: supporting the primary drive, the output shaft, the power transfer mechanism, and the position sensor by the housing with the output shaft located in a predetermined neutral position; adjusting the position sensor so that the neutral position of the output shaft and the reference position of the position sensor match; fixing the housing of the actuator to part of the vehicle; and connecting the exposed portion of the shift shaft of the power unit and the output shaft of the actuator to each other with a connecting device.

The shift actuator has a power transfer mechanism having an anti-inversion function (the function of not rotating by an external force, in other words, a self-locking function) between the primary drive and the output shaft, that is, a power transfer mechanism that transfers a driving force from the primary drive to the output shaft but transfers no driving force form the output shaft to the primary drive. Accordingly, even if an external force is applied to the output shaft at the mounting of the housing, there is no possibility that the output shaft located in the neutral position is displaced by the external force. This facilitates ensuring the neutral position of the shift actuator, thus improving the accuracy of mounting the shift actuator. With the shift actuator, the position sensor can be adjusted before the housing is mounted to part of the vehicle. This improves the sensing accuracy of the position sensor.

The invention provides a shift actuator disposed outside a power unit that is easily positioned in the neutral position during mounting.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a left side view of a motorcycle according to an embodiment of the invention.

FIG. 2 is a partially cutaway sectional view of a power unit of the invention.

FIG. 3 is a partial sectional view of the power unit.

FIG. 4 is an exploded perspective view of a part of a transmission of the invention.

FIG. 5 is a partial left side view of the motorcycle.

FIG. 6 is an internal schematic diagram of an actuator of the invention.

FIG. 7 is a sectional view of the actuator taken along line VII-VII of FIG. 6.

FIG. 8 is a right side view of the actuator.

FIG. 9 is a front view of the actuator.

FIG. 10(*a*) is a side view of a rotating lever of the invention; and FIG. 10(*b*) is a diagram of the rotating lever, indicated by arrow Xb of FIG. 10(*a*).

FIG. 11(a) is a side view of a rotating arm of the invention; and FIG. 11(b) is a diagram of the rotating arm, indicated by arrow XIb of FIG. 11(a).

FIG. 12 is a side view of a rod of the invention.

FIG. 13 is a partial plan view of the motorcycle.

FIG. 14 is a perspective view of a switch box of the invention.

FIG. 15 is a partial side view of a motorcycle according to a second embodiment of the invention.

FIG. 16 is a front view of a rod according to the second embodiment.

FIG. 17(a) is a front view of a rod member of the invention; and FIG. 17(b) is a side view of the rod member.

FIG. 18 is a schematic diagram of another embodiment of the invention in which an output shaft and a shift shaft of an actuator are directly connected.

DETAILED DESCRIPTION OF THE INVENTION

Embodiments of the invention are described below in detail with reference to the drawings.

First Embodiment

Referring to FIG. 1, a vehicle according to the invention is a motorcycle 10. The motorcycle 10 includes a body frame 11 and a seat 16 for a rider. The motorcycle 10 is a moped. The term "moped" as used herein denotes merely the type of vehicle in terms of shape and does not limit the maximum speed, piston displacement, or size of the vehicle. The invention is not limited to a moped but may be another type of motorcycle, such as one with a fuel tank ahead of the seat, or another type of vehicle such as a motor tricycle or an all-terrain vehicle (ATV).

In the following description, front, rear, right, and left denote directions from the perspective of a rider seated on seat 16. The body frame 11 includes: a steering head pipe 12; a main frame 13 extending from the steering head pipe 12 obliquely downward toward the rear; a pair of right and left seat rails 14 extending from the middle of the main frame 13 obliquely upward toward the rear; and a pair of right and left backstays 15 obliquely extending toward the upper rear from the main frame 13 and behind the seat rails 14. The backstays 15 are connected between the rear end of the main frame 13 and the middle of the seat rails 14. The steering head pipe 12 supports a front wheel 19 with a front fork 18 therebetween.

The upper part and right and left sides of the body frame 11 are principally covered with a main cover 21a and side covers 21b. The main cover 21a and the side covers 21b are herein collectively referred to as a body cover 21.

A pair of right and left first engine brackets 22 projecting downward is provided in the middle of the main frame 13. A pair of right and left second engine brackets and a pair of right and left rear-arm brackets (both are not shown) are provided at the rear end of the main frame 13. The brackets at the main frame 13 constitute part of the body frame 11.

The rear-arm brackets project downward from the rear end of the main frame 13. The rear-arm brackets have a pivot shaft 86. The pivot shaft 86 pivotally supports the front end of a rear arm 25. The rear end of the rear arm 25 supports a rear wheel 26. The rear half of the rear arm 25 is suspended by the body frame 11 with a cushion unit 27 therebetween.

The motorcycle 10 includes a front fender 31 that covers the upper and rear of the front wheel 19 and a rear fender 32 that covers the obliquely upper rear portion of the rear wheel 26. The motorcycle 10 further includes, in addition to the body cover 21, a front cowl 33 and right and left leg shields 34.

The body frame 11 supports a power unit 28 that drives the rear wheel 26. The power unit 28 includes a crankcase 35 and a cylinder 43 extending forward or obliquely upward toward the front from the crankcase 35.

Footrests 85 are disposed on the right and left of the power unit 28. The right and left footrests 85 are supported by the crankcase 35 with a connecting rod 87 and a mounting plate 88 fixed to the connecting rod 87 therebetween.

Referring to FIGS. 2 and 3, the structure of the power unit 28 is described. The power unit 28 includes an engine 29 having a crankshaft 30, a centrifugal clutch 36, a gear-shift clutch 37 that is engaged or disengaged at gear-shift operation, and a transmission 38. While the type of the engine 29 is not limited, the engine 29 of the embodiment is a four-stroke single-cylinder engine.

As shown in FIG. 3, the centrifugal clutch 36 is mounted to the right end of the crankshaft 30. The centrifugal clutch 36 has a clutch boss fixed to the crankshaft 30 and a clutch housing (both are not shown). The centrifugal clutch 36 is disengaged while idling and engaged during running. In other words, the centrifugal clutch 36 is disengaged when the rotation speed of the crankshaft 30 (engine RPM) is lower than a predetermined speed and engaged when it becomes higher than the predetermined speed.

The gear-shift clutch 37 is a multiplate wet clutch, which has a clutch boss 37a and a clutch housing 37b. Here, the type of the gear-shift clutch 37 is not particularly limited. The centrifugal clutch 36 has a gear 41, while the clutch housing 37b of the gear-shift clutch 37 has a gear 42. The gear 41 and the gear 42 are in engagement with each other. Thus, the clutch housing 37b of the gear-shift clutch 37 rotates with the centrifugal clutch 36 (specifically, the clutch housing of the centrifugal clutch 36).

The clutch boss 37a is mounted to a main shaft 44, so that it rotates with the main shaft 44. The clutch housing 37b is rotatably mounted to the main shaft 44. The clutch boss 37a has a plurality of friction plates 39a, while the clutch housing 37b has a plurality of clutch plates 39b. The friction plates 39a are each disposed between adjacent clutch plates 39b.

A pressure plate 37c is disposed to the right of the clutch boss 37a. The pressure plate 37c is slidable along the axis, and urged to the left by a compression spring 60. That is, the pressure plate 37c is urged in the direction in which the friction plates 39a and the clutch plates 39b are brought into pressure contact with each other. When the pressure plate 37c moves to the right against the urging force of the compression spring 60, the friction plates 39a and the clutch plates 39b are separated, so that the gear-shift clutch 37 is disengaged.

As shown in FIG. 2, there is a plurality of speed-change gears 46 around the outer periphery of the main shaft 44. A drive shaft 45, which is disposed in parallel with the main shaft 44, is fitted with a plurality of speed-change gears 47. The speed-change gears 46 on the main shaft 44 and the speed-change gears 47 on the drive shaft 45 are in engagement as appropriate.

One or both of the speed-change gears 46 and the speed-change gears 47 except selected gears is mounted in an idling state to the main shaft 44 or the drive shaft 45. Accordingly, the driving force from the main shaft 44 is transferred to the drive shaft 45 via the selected pair of speed-change gear.

The selection of the speed-change gears is performed via a shift cam 113 (refer to FIG. 4). As shown in FIG. 4, the transmission 38 includes a shift fork 111a for sliding the speed-change gears 46 along the axis of the main shaft 44 and a slide rod 112a for slidably supporting the shift fork 111a. The transmission 38 further includes a shift fork 111b for sliding the speed-change gears 47 along the axis of the drive shaft 45 and a slide rod 112b for slidably supporting the shift fork 111b. The shift cam 113 has a cam groove 113a therearound. The shift forks 111a and 111b slide along the cam groove 113a.

The shift cam 113 rotates via a ratchet mechanism 115 by the rotation of the shift shaft 70. The ratchet mechanism 115 rotates the shift cam 113 at regular intervals (angles) to regularly move the shift forks 111a and 111b, and has a reciprocal ratchet function for changing the gears one step by one step. A shift arm 116 of the ratchet mechanism 115 transfers the rotation of the shift shaft 70 and controls the stroke of the shift shaft 70 to thereby prevent the overrun of the shift cam 113. A stopper plate 117 of the ratchet mechanism 115 fixes the shift cam 113 to a predetermined position.

As shown in FIG. 3, the hollow main shaft 44 is rotatably supported by a bearing 540. In the main shaft 44, a first push rod 527, a ball 528, and a second push rod 529 are axially movably inserted, with the movement of which, the pressure plate 37c moves laterally.

The second push rod 529 has a collar 529b. A bearing 533 is disposed between the collar 529b and the pressure plate 37c. This makes the second push rod 529 not rotate but the pressure plate 37c rotate.

A nut 536a at a first end of a lever 536 is screwed on a male screw 535a of the shift shaft 70. A second end 536b of the lever 536 is in contact with a small-diameter portion 527b of the first push rod 527. The lever 536 is connected at a central supporting point 536c to a support shaft 537, and rotates about the supporting point 536c. The shift shaft 70 is held in a predetermined neutral position by a spring 90 built in the power unit 28 while no external driving force is transmitted to the shift shaft 70.

When the shift shaft 70 rotates by the external driving force, the nut 536a of the lever 536, which is screwed on the male screw 535a of the shift shaft 70, moves to the left. With the movement of the nut 536a, the lever 536 rotates, so that the second end 536b of the lever 536 pushes the first push rod 527 to the right, and thus the first push rod 527 slides to the right. The second push rod 529 is pushed to the right by the first push rod 527 via the ball 528 to slide to the right.

As the second push rod 529 slides, the pressure plate 37c is moved to the right against the urging force of the compression spring 60. As a result, the pressure contact between the friction plates 39a and the clutch plates 39b is released to disengage the gear-shift clutch 37.

Thus, the shift shaft 70 and the pressure plate 37c are connected together through the lever 536, the first push rod 527, the ball 528, and the second push rod 529, so that the pressure plate 37c moves with the rotation of the shift shaft 70. In other words, when the shift shaft 70 starts to rotate and the rotation angle of the shift shaft 70 reaches a predetermined angle (a clutch-release starting angle), the pressure plate 37c moves to the right to disengage the gear-shift clutch 37. When the shift shaft 70 further rotates to reach a predetermined angle (gear-shift start angle), the shift cam 113 rotates to start a gear-shift operation.

The crankshaft 30 is fitted at the left end with a flywheel magneto 50 as a rotor that rotates with the crankshaft 30. The flywheel magneto 50 configures the rotor of a generator 51.

As shown in FIG. 2, the crankcase 35 includes a first casing 52 and a second casing 53. Although not shown, the first casing 52 is composed of a plurality of casing members, and mainly covers part of the crankshaft 30, the centrifugal clutch 36, the gear-shift clutch 37, the main shaft 44, part of the drive shaft 45, and the shift cam 113. The second casing 53 covers the flywheel magneto 50. The second casing 53 is located ahead of the first casing 52 in the front-back direction of the vehicle. The second casing 53 projects outside the first casing 52 in the width direction of the vehicle (to the left in FIG. 2). Although the first casing 52 and the second casing 53 of the embodiment are separate from each other, they may be integrated into one.

As shown in FIG. 3, part of the shift shaft 70 projects out of the crankcase 35 to form a projecting portion 70a. As shown in FIG. 2, part of the drive shaft 45 also projects out of the crankcase 35. A sprocket 54 is fixed to a projecting portion 45a of the drive shaft 45. Around the sprocket 54 and the sprocket (not shown) of the rear wheel 26, a chain 55 is wound. The transfer member for transferring the driving force of the drive shaft 45 to the rear wheel 26 is not limited to the chain 55, but may be another transfer member such as a transfer belt or a drive shaft.

As shown in FIG. 5, a chain cover 56 is disposed on a side of the chain 55 (on the front side of FIG. 5). The chain cover 56 covers the upper and lower part and the outer part of the chain 55 in the vehicle width direction. The cylinder 43 (refer to FIG. 1) of the power unit 28 is not shown in FIG. 5.

As shown in FIG. 5, the motorcycle 10 has an actuator 75 for rotating the shift shaft 70. The actuator 75 is connected to the shift shaft 70 via the connecting device 61. The structure of the actuator 75 is now described.

FIG. 6 is an internal schematic diagram of the actuator 75; FIG. 7 is a cross-sectional view taken along line VII-VII of FIG. 6; FIG. 8 is a right side view of the actuator 75; and FIG. 9 is a front view of the actuator 75.

As shown in FIG. 6, the actuator 75 includes a motor 77 composed of a motor body 77a and a motor shaft 77b, a worm 79 fixed to the motor shaft 77b, a worm wheel 80 engaged with the worm 79, and an output shaft 81 serving as the rotation shaft of the worm wheel 80. One end and the other end of the worm 79 are each supported by a bearing 101. The worm wheel 80 is a thin plate, which has the shape of a sector as viewed along the axis of the output shaft 81.

A worm gear 80A composed of the worm 79 and the worm wheel 80 has a reduction ratio higher than that of a gear composed of a plurality of spur gears. In this embodiment, the reduction ratio of the worm gear 80A is set to 100 or higher. The worm gear 80A transfers the driving force of the motor 77 to the output shaft 81, but transfers no driving force from output shaft 81 to motor 77. That is, worm gear 80A has an anti-inversion function, thus configuring a self-locking mechanism.

The actuator 75 further includes a case 76 for housing the motor 77, the worm 79, and the worm wheel 80. The case 76 is a thin case (refer to FIGS. 9 and 13) that is thin along the axis of output shaft 81. The case 76 is composed of a first case 76a and a second case 76b (refer to FIG. 13) which can be divided from each other.

The second case 76b located adjacent to the outer side of the vehicle width has a hole for the output shaft 81 to pass through, through which the output shaft 81 projects out of the case 76. As shown in FIG. 9, the first case 76a located inside along the width of the vehicle is fitted with a potentiometer S1 for sensing the rotational position of the output shaft 81. Although not shown, the potentiometer S1 connects to a signal line. The signal line is connected to an electronic control unit (ECU) (not shown).

As shown in FIGS. 7 and 9, a mating face 96 (refer also to FIG. 6) of the first case 76a and the second case 76b which covers the motor 77 is a plane including the axis 77c of the motor shaft 77b. A mating face 97 (refer also to FIG. 6) of the first case 76a and the second case 76b which covers the worm 79 is also a plane including the axis 77c of the motor shaft 77b.

As shown in FIG. 6, the first and second cases 76a and 76b have a plurality of bolt holes 73 and 74 at the periphery thereof. The first and second cases 76a and 76b are joined together with bolts 99 (refer to FIG. 5) passed through the bolt holes 73 and 74. As shown in FIG. 5, the main frame 13 and the seat rails 14 have a bracket 24. The first and second cases 76a and 76b are mounted to the bracket 24 with the bolts 99 passed through the bolt holes 74. The actuator 75 is disposed in the region A1 defined by the main frame 13, the seat rails 14, and the backstays 15, as viewed from the side.

As shown in FIGS. 5 and 6, motor 77 extends in a direction perpendicular or substantially perpendicular to the vehicle width direction. Thus, the axis 77c of the motor 77 is substantially perpendicular to the vehicle width direction. The axis 77c is also the axis of the worm 79. The output shaft 81 extends in the direction perpendicular to the axis 77c. Thus, the output shaft 81 extends substantially along the width of the vehicle.

A connecting device 61 that connects the actuator 75 and the shift shaft 70 is now described.

As shown in FIG. 5, the connecting device 61 connects the output shaft 81 of the actuator 75 and the projecting portion 70a of the shift shaft 70 on the outside of the crankcase 35 of the power unit 28. The projecting portion 70a of the shift shaft 70 is disposed at the obliquely lower rear of the flywheel magneto 50 as viewed from the side. The connecting device 61 includes a rotating lever 71 connected to the output shaft 81, a rotating arm 72 connected to the projecting portion 70a of the shift shaft 70, and a rod 63 that connects the rotating lever 71 and the rotating arm 72. The rod 63 is connected to the rotating lever 71 and the rotating arm 72 in such a manner as to tilt in the direction of the vehicle width.

In this embodiment, the rod 63 and the rotating lever 71, and the rod 63 and the rotating arm 72 are each joined together with connecting devices that connect the rod 63 to the rotating lever 71 and the rotating arm 72 in such a manner as to tilt in the direction of the vehicle width. Referring to FIGS. 10 and 11, the embodiment uses ball joints 64 as the connecting devices. Thus, one end of the rod 63 is connected to the rotating lever 71 via the boll joint 64, while the other end thereof is connected to the rotating arm 72 via the boll joint 64.

The ball joint 64 includes a cylindrical part 64a in which the end of the rod 63 is inserted and a ball 64b that supports the cylindrical part 64a in such a manner as to rotate 360 degrees. A nut 69 is fit on the tip end of the cylindrical part 64a to tighten the rod 63 inserted. The rod 63 is detachably connected to the ball joint 64.

Referring to FIG. 10, a substantially C-shaped first connecting portion 71b in side view is provided at the base of the rotating lever 71 (on the right in FIG. 10(a)). A fixing hole 71a in which the output shaft 81 of the actuator 75 is fit is provided in the center of the first connecting portion 71b. A bolt hole 71c for a bolt 66 is provided to the right of the fixing hole 71a. The bolt 66 fixes the first connecting portion 71b and the output shaft 81 to each other. Thus, the rotating lever 71 and the output shaft 81 are detachably joined via the bolt 66.

Referring to FIG. 11, a substantially C-shaped second connecting portion 72b in side view is provided at the base of the rotating arm 72 (on the left in FIG. 11(a)). A fixing hole 72a in which the projecting portion 70a of the shift shaft 70 is fit is provided in the center of the second connecting portion 72b. A bolt hole 72c for the bolt 66 is provided under the fixing hole 72a. The bolt 66 fixes the second connecting portion 72b and the projecting portion 70a of the shift shaft 70 to each other. Thus, the rotating arm 72 and the projecting portion 70a of the shift shaft 70 are detachably joined via the bolt 66.

As shown in FIG. 10, the rotating lever 71 is in the form of a plate extending substantially in the front-back direction. As shown in FIG. 11, the rotating arm 72 is also in the form of a plate extending substantially in the front-back direction. The rotating arm 72 however does not extend linearly in one direction but is bent inward along the width of the vehicle from the base toward the tip end. However, the structures of the rotating lever 71 and the rotating arm 72 are not limited at all.

As shown in FIG. 12, the rod 63 is formed in one piece. Referring to FIG. 5, the rod 63 is disposed vertically or substantially vertically as viewed from the side. The rod 63 extends vertically behind the flywheel magneto 50 as viewed from the side. In other words, the rod 63 passes through the side of the first casing 52 and the back of the second casing 53. The rod 63 overlaps with the sprocket 54 connected to the drive shaft 45, and also overlaps with the chain 55 in side view.

As shown in FIG. 13, the rod 63 is inclined in the vehicle width direction. Specifically, the rotating lever 71 is disposed inwardly of the rotating arm 72 in the vehicle width direction, and rod 63 is inclined such that the upper end is positioned inwardly of the lower end in the vehicle width direction. Rod 63 is disposed inwardly of the outer end of second casing 53 in the vehicle width direction.

As shown in FIG. 5, an inner cover 82 is provided between the rod 63 and the chain 55. The inner cover 82 is a vertically thin and long bent plate, which partitions the rod 63 from the chain 55. The inner surface of the inner cover 82 is close to the chain 55. The position and method for fixing the inner cover 82 are not limited at all. For example, the inner cover 82 may be fixed to the crankcase 35 or a bracket (not shown) with bolts (not shown) or the like.

Referring to FIGS. 1 and 13, most of the rod 63 is covered with an outer cover 83. In this embodiment, the outer cover 83 also covers most of the rotating arm 72. The outer cover 83 also covers the side of the chain 55 together with the chain cover 56. Referring to FIG. 13, the outer cover 83 has at the upper part a recess 83a for the rod 63 to vertically pass through.

The position and method for fixing the outer cover 83 are not limited at all. For example, the outer cover 83 may be fixed to the crankcase 35, a bracket (not shown), or the chain cover 56 with a bolt 84 (refer to FIG. 1). The outer cover 83 can be removed with the side cover 21b and the actuator 75 fixed. Thus, this embodiment is constructed such that only the outer cover 83 can be removed without removing the side cover 21b and the actuator 75. The outer cover 83 may be formed in one piece or may be a combination of a plurality of cover members.

Referring to FIG. 1, the actuator 75 and the rotating lever 71 (both are not shown in FIG. 1) are covered with the side covers 21b. The outer cover 83 and the side covers 21b cover almost all the connecting device 61.

Referring to FIG. 14, the steering handle has a switch box 94 having a shift switch 95 at the left grip. The shift switch 95 is composed of a shift-up switch 95a and a shift-down switch 95b, for shifting the gear of the transmission 38 between the first to the highest speed (for example, the sixth speed) as appropriate. When the shift-up switch 95a or the shift-down switch 95b is pushed, the actuator 75 is activated to rotate the shift shaft 70 via the connecting device 61. The gear-shift clutch 37 is disengaged with the rotation of the shift shaft 70 to change the combination of the gears 46 and 47 of the transmission 38 (the combination of engaging gears) for gearshift operation.

A method for mounting the actuator 75 is now described.

The worm wheel 80 is located in a predetermined neutral position (where the worm wheel 80 is symmetrical in front-back direction, shown in FIG. 6), and temporarily fixed so as not to rotate about the case 76. With the worm wheel 80 in a temporarily fixed state, the worm 79 and the motor 77 are disposed in the case 76. The potentiometer S1 is mounted to the first case 76*a* with the worm wheel 80 in a temporarily fixed state. Then the potentiometer S1 is adjusted so that the neutral position of the output shaft 81 (the neutral position of the worm wheel 80) and the reference position of the potentiometer S1 (for example, zero point) match. Subsequently, the first case 76*a* and the second case 76*b* are placed one on another.

The actuator 75 is fixed to the brackets 24 of the body frame 11 with the bolts 99. Thus the actuator 75 is positioned such that the motor shaft 77*b* and the worm 79 intersect the width of the vehicle.

Then the rotating lever 71 is mounted to the output shaft 81 of the actuator 75. The rotating arm 72 is fixed to the projecting portion 70*a* of the shift shaft 70. Since the embodiment has the worm gear 80A between the motor 77 of the actuator 75 and the output shaft 81, the rotation of the output shaft 81 is prevented even if an external force is applied to the output shaft 81. This prevents the worm wheel 80 from being displaced from the neutral position even if a force is erroneously applied to the output shaft 81 during mounting the rotating lever 71. Similarly, there is no possibility that the shift shaft 70 is displaced from the neutral position during mounting the rotating arm 72 since it is held in the neutral position by the spring 90 built in the power unit 28.

Finally, the rod 63 is mounted to the rotating lever 71 and the rotating arm 72. Specifically, an end of the rod 63 is inserted into the cylindrical part 64*a* of the ball joint 64 adjacent to the rotating lever 71, and the other end of the rod 63 is inserted into the cylindrical part 64*a* of the ball joint 64 adjacent to the rotating arm 72. Then the length of the rod 63 is adjusted (the length of the rod 63 can be adjusted by controlling the amount of insertion of the rod 63), and the nuts 69 of the ball joints 64 are tightened. In this case also, even if an external force is applied to the output shaft 81 of the actuator 75, the worm wheel 80 is not displaced from the neutral position.

As described above, the actuator 75 for shifting the gears of the transmission 38 is disposed outside the power unit 28. Accordingly, the actuator 75 has high versatility of installation, thus increasing the flexibility of layout of the vehicle. Moreover, since the actuator 75 is disposed in the space of the vehicle, the size of the vehicle can be decreased. In this embodiment, between the motor 77 of the actuator 75 and the output shaft 81 is disposed a power transfer mechanism (the worm gear 80A) that transfers a driving force from the motor 77 to the output shaft 81 but transfers no driving force from the output shaft 81 to the motor 77. This prevents the output shaft 81 from being displaced from a predetermined neutral position by an external force when the actuator 75 is mounted to part of the vehicle. This facilitates ensuring the neutral position of the output shaft 81, increasing the accuracy of mounting the actuator 75. In other words, the actuator 75 is mounted with sufficient accuracy even if it is disposed outside the power unit 28.

According to this embodiment, the potentiometer S1 can be adjusted before the case 76 of the actuator 75 is mounted to the body frame 11. This allows the reference position (zero point) of the potentiometer S1 to be set accurately, thus increasing the sensing accuracy of the potentiometer S1.

The embodiment uses the worm gear 80A including the worm 79 and the worm wheel 80 as a power transfer mechanism having the foregoing characteristics for transferring a driving force from the primary drive (the motor 77) of the actuator 75 to the output shaft 81 but transferring no driving force opposite thereto. Thus the power transfer mechanism can be decreased in size, so that the actuator 75 and the vehicle can be reduced in size as well. The worm gear 80A has a high reduction ratio, which also leads to reduction of the size of the actuator 75.

In the embodiment, the worm 79 is connected to the motor shaft 77*b*, and the worm wheel 80 is connected to the output shaft 81. In other words, worm 79 and motor shaft 77*b* are directly fixed together, and worm wheel 80 and output shaft 81 are directly fixed together, between which no members are interposed. This arrangement reduces the number of components, and the size of the actuator 75.

The worm 79 of the embodiment has the shape of a sector. This reduces the size of the worm 79 in comparison with the shape of a disc. This also contributes to the size reduction of the actuator 75.

In this embodiment, the engagement and disengagement of the gear-shift clutch 37 and the gear-shift operation of the transmission 38 are performed by the rotation of the shift shaft 70. Thus, the engagement and disengagement of the gear-shift clutch 37 and the gear-shift operation of the transmission 38 are executed by a single actuator 75. This increases the operation range (rotation angle) of the output shaft 81 of the actuator 75 as compared with the case where the actuator 75 executes only the gear-shift operation of the transmission 38. However, since the embodiment has the worm gear 80A having a high reduction ratio, the motor 77 can be decreased in size although the output shaft 81 has a wide operation range. Consequently, the actuator 75 can be reduced in size.

According to this embodiment, the actuator 75 is disposed such that the motor shaft 77*b* and the worm 79 intersect the width of the vehicle. Accordingly, although the actuator 75 is disposed outside the power unit 28, the actuator 75 is prevented from protruding along the width of the vehicle, thus reducing the width of the vehicle.

In this embodiment, the axis 77*c* of the motor 77 of the actuator 75 extends in the direction perpendicular to the width of the vehicle. The "perpendicular" here includes not only "perpendicular" in the strict sense of the word but also "substantially perpendicular". Since the axis 77*c* of the motor 77 extends in the direction perpendicular to the width of the vehicle, the output shaft 81 extends along the width of the vehicle. As a result, the connecting device 61 moves in the plane perpendicular to the width of the vehicle (for example, the plane along the front-back direction of the vehicle). Thus, the connecting device 61 does not protrude along the width of the vehicle with the movement, further decreasing the width of the motorcycle 10.

According to the embodiment, the output shaft 81 of the actuator 75, the worm gear 80A, and the motor 77 are covered with the case 76. This protects the motor 77 and so on from dust or water, thus enhancing the reliability of the actuator 75.

The case 76 of the actuator 75 is composed of the first case 76*a* and the second case 76*b* having a shallow and almost disc shape. The mating face 96 of the first case 76*a* and the second case 76*b* which covers the motor 77 is a plane including the axis 77*c* of the motor shaft 77*b*. This decreases the width of the case 76 of the actuator 75.

The mating face 97 of the first case 76a and the second case 76b which covers the worm 79 is also a plane including the axis 77c of the motor shaft 77b. This further decreases the width of the case 76 of the actuator 75.

In this embodiment, the rod 63 extends vertically, so that the rod 63 is short in length in the front-back direction, and the necessary length of rod 63 is reduced.

The actuator 75 of this embodiment is separate from the power unit 28. Accordingly, the actuator 75 is not directly subjected to the heat or vibration from the power unit 28, so that the reliability and life of the actuator 75 is improved.

According to the embodiment, the actuator 75 is disposed in the region A1 defined by the main frame 13, the seat rails 14, and the backstays 15, as viewed from the side. Thus, the region A1 is effectively used as the installation space for the actuator 75.

According to the embodiment, the outside of the rod 63 in the vehicle width direction is covered with the outer cover 83, so that the rod 63 is protected. Moreover, since the outer cover 83 also covers part of the rotating lever 71 and the rotating arm 72, the rotating lever 71 and the rotating arm 72 is also protected. Since the rotating lever 71 and the actuator 75 are covered with the side frame 21b, the actuator 75 etc. is also protected.

The connecting device 61 includes the first connecting portion 71b connected to the output shaft 81 of the actuator 75 and the second connecting portion 72b connected to the projecting portion 70a of the shift shaft 70. The first connecting portion 71b is disposed inwardly of the second connecting portion 72b in the vehicle width direction. Therefore, this allows the actuator 75 to be disposed more inward, thereby decreasing the width of the motorcycle 10.

According to this embodiment, the rod 63 is connected to the rotating lever 71 and the rotating arm 72 in such a manner as to tilt in the vehicle width direction, so that the rod 63 is inclined in the vehicle width direction. This allows the actuator 75 to be disposed inside using the linearly extending rod 63. That is, the actuator 75 can be disposed inside with a simple structure.

Second Embodiment

Referring to FIGS. 15 and 16, a second embodiment is a modification of the first embodiment, in which the rod 63 of the connecting device 61 is modified.

In the second embodiment, the rod 63 is composed of a plurality of rod members that are detachably connected together, and is adjustable in length. The rod 63 here is composed of a first rod member 91 and a second rod member 92.

Referring to FIGS. 17(a) and (b), the second rod member 92 has at the top a substantially U-shaped gripper 92a that is open upward. The gripper 92a has two upper and lower circular holes 92b and two upper and lower nuts 92c corresponding to the circular holes 92b. The first rod member 91 has at the lower part an inserted portion 91a to be inserted into the gripper 92a. The inserted portion 91a has two vertically thin and long holes 91b.

As shown in FIG. 16, the first rod member 91 and the second rod member 92 are tightened by bolts 93 that pass through the circular holes 92c, the long holes 91b, and the nuts 92c. Since the inserted portion 91a has the long holes 91b, the bolts 93 can vertically slide in the long holes 91b. This allows the first rod member 91 and the second rod member 92 to be relatively moved axially, thus allowing adjustment of the length of the rod 63.

The first rod member 91 and the second rod member 92 are connected as shown below. The connection between the first rod member 91 and the second rod member 92 is performed after the first rod member 91 has been connected to the ball joint 64 adjacent to the rotating lever 71 and the second rod member 92 has been connected to the ball joint 64 adjacent to the rotating arm 72.

The inserted portion 91a of the first rod member 91 is first inserted into the gripper 92a of the second rod member 92; then the bolts 93 are inserted into the circular holes 92b of the gripper 92a, the long holes 91b of the inserted portion 91a, and the nuts 92c of the gripper 92a to temporarily fasten them; and the first rod member 91 and the second rod member 92 are relatively moved axially so that the entire length of the rod 63 reaches a desired length. In short, the length of the rod 63 is adjusted. After the rod 63 has reached a desired length, the bolts 93 are screwed into the nuts 92c to secure them.

Since the other structures are the same as those of the first embodiment, explanations thereof are omitted here.

This embodiment provides the same advantages as the first embodiment.

According to this embodiment, the connecting member 61 that connects the projecting portion 70a of the shift shaft 70 and the output shaft 81 is adjustable in length, thus facilitating the work of mounting the actuator 75. The easy mounting work improves the accuracy of mounting the actuator 75.

In this embodiment, the rod 63 that is adjustable in length is composed of the first rod member 91 and the second rod member 92 that are slidably joined together. Both the first rod member 91 and the second rod member 92 have the shape of a rod. The inserting portion 91a of the first rod member 91 has the long holes 91b extending along the length, while the gripper 92a of the second rod member 92 has the circular holes 92b. The connecting member 61 further has the bolts 93 that pass through the long holes 91b and the circular holes 92b and the nuts 92c for fixing the bolts 93 as fixing members for fixing the first rod member 91 and the second rod member 92. This allows adjustment of the length of the connecting member 61 with a relatively simple structure. Moreover, it simplifies and ensures the work of adjusting the length of the connecting member 61.

Other Embodiments

The invention is not limited to the above described embodiments but can be embodied in various forms.

In the foregoing embodiments, the power transfer mechanism having a self-locking function, that is, the power transfer mechanism that transfers the driving force from the primary drive to the output shaft but no driving force from the output shaft to the primary drive, is the worm gear 80A. However, the power transfer mechanism according to the invention is not limited to the worm gear 80A but may be any power transfer mechanism having a self-locking function. For example, the known mechanisms disclosed in JP-A-2002-27147, JP-A-2002-174320, and JP-A-2003-074645 may be used.

In the foregoing embodiments, the shift shaft 70 is constructed of one shaft. However, the shift shaft 70 may be constructed of two or more shafts that rotate to apply and release the clutch and shift the gears of the transmission. For example, the shift shaft 70 may be branched to two first and second shafts via gears or the like in the crankcase 35, the first shaft engaging or disengaging the clutch and the second shaft shifting the gears of the transmission while synchronizing with the first shaft.

In the foregoing embodiments, the projecting portion (exposed portion) 70a of the shift shaft 70 and the output shaft 81 of the actuator 75 are connected indirectly via the connecting member 61. However, the shift shaft 70 and the output shaft

81 may be connected directly, as schematically shown in FIG. 18. In the embodiment shown in FIG. 18, there are a case 35*a* (the case 35*a* may either be integrated with the crankcase 35, as shown in FIG. 18, or may be separate therefrom) and a case 35*b* outside the crankcase 35. The cases 35*a* and 35*b* are joined together with bolts 201 and nuts 202. The case 76 and the output shaft 81 of the actuator 75 are accommodated in the cases 35*a* and 35*b*. The case 76 is fixed to the case 35*b* with bolts 203.

As has been described above, the invention is useful for a shift actuator for shifting the gears of a transmission, a vehicle having the same, and a method for mounting the shift actuator.

The particular embodiments of the invention described in this document should be considered illustrative, rather than restrictive. Modification to the described embodiments may be made without departing from the spirit of the invention as defined by the following claims.

The invention claimed is:

1. A shift actuator to be mounted to a vehicle equipped with a power unit including a transmission including a plurality of gears, a shift shaft arranged to change the gears of the transmission, and a casing arranged to cover the shift shaft and the transmission so as to expose part of the shift shaft externally, the shift actuator comprising:
   a primary drive;
   an output shaft arranged to be connected directly or indirectly to the exposed part of the shift shaft;
   a power transfer mechanism interposed between the primary drive and the output shaft and arranged to transfer a driving force from the primary drive to the output shaft and to transfer no driving force from the output shaft to the primary drive;
   a housing arranged to support the primary drive, the output shaft, and the power transfer mechanism; and
   a position sensor supported by the housing and arranged to sense the position of the output shaft.

2. The shift actuator according to claim 1, wherein the power transfer mechanism comprises a worm and a worm wheel in engagement with the worm.

3. The shift actuator according to claim 2, wherein:
   the primary drive includes a motor including a rotation shaft;
   the worm is connected to the rotation shaft; and
   the worm wheel is connected to the output shaft.

4. The shift actuator according to claim 3, wherein the worm wheel has substantially a shape of a sector.

5. The shift actuator according to claim 3, wherein:
   the housing includes first and second halved housing members arranged to cover the output shaft, the motor, the worm, and the worm wheel so as to expose part of the output shaft externally; and
   a mating face of parts of the first and second halved housing members is a plane including an axis of a rotation shaft of the motor.

6. The shift actuator according to claim 3, wherein:
   the housing includes first and second halved housing members arranged to cover the output shaft, the motor, the worm, and the worm wheel so as to expose part of the output shaft externally; and
   a mating face of parts of the first and second halved housing members is a plane including an axis of the worm.

7. A vehicle comprising:
   a power unit including:
      a transmission including a plurality of gears;
      a shift shaft arranged to change the gears of the transmission; and
      a casing arranged to cover the shift shaft and the transmission so as to expose part of the shift shaft externally; and
   a shift actuator including:
      a primary drive;
      an output shaft connected directly or indirectly to the exposed part of the shift shaft;
      a power transfer mechanism interposed between the primary drive and the output shaft and arranged to transfer a driving force from the primary drive to the output shaft and to transfer no driving force from the output shaft to the primary drive;
      a housing arranged to support the primary drive, the output shaft, and the power transfer mechanism; and
      a position sensor supported by the housing and arranged to sense the position of the output shaft.

8. The vehicle according to claim 7, wherein the power transfer mechanism comprises a worm and a worm wheel in engagement with the worm.

9. The vehicle according to claim 8, wherein:
   the primary drive includes a motor including a rotation shaft;
   the worm is connected to the rotation shaft; and
   the worm wheel is connected to the output shaft.

10. The vehicle according to claim 9, wherein the worm wheel has substantially the shape of a sector.

11. The vehicle according to claim 7, wherein:
    the power unit includes a clutch that is engaged or disengaged at the gear-shift operation; and
    the shift shaft is arranged to perform a gear change of the transmission and to engage or disengage the clutch.

12. The vehicle according to claim 7, wherein
    the primary drive includes a motor having a rotation shaft, wherein
    a rotation shaft of the motor is arranged perpendicular to a width of the vehicle.

13. The vehicle according to claim 7, wherein the housing is arranged to cover the output shaft, the power transfer mechanism, and the primary drive so as to expose part of the output shaft externally.

14. The vehicle according to claim 9, wherein:
    the housing includes first and second halved housing members arranged to cover the output shaft, the motor, the worm, and the worm wheel so as to expose part of the output shaft externally; and
    a mating face of parts of the first and second halved housing members is a plane including an axis of the rotation shaft of the motor.

15. The vehicle according to claim 9, wherein:
    the housing includes first and second halved housing members arranged to cover the output shaft, the motor, the worm, and the worm wheel so as to expose part of the output shaft externally; and
    a mating face of parts of the first and second halved housing members is a plane including an axis of the worm.

16. The vehicle according to claim 7, further comprising a connecting device that is adjustable in length and arranged to connect the exposed part of the shift shaft and the output shaft together.

17. The vehicle according to claim 16, wherein the connecting device comprises a first connecting member, a second connecting member, and a fixing member that connects the first connecting member and the second connecting member so as to change a relative position thereof.

18. The vehicle according to claim 17, wherein the first connecting member and the second connecting member are in slidable engagement with each other.

19. The vehicle according to claim 18, wherein:
- both the first connecting member and the second connecting member have a substantial rod shape;
- the first connecting member includes a first hole, and the second connecting member includes a second hole;
- at least one of the first hole and the second hole is a long hole extending along a length of the first connecting member or the second connecting member; and
- the fixing member includes a bolt passing through the first hole and the second hole and a nut for fixing the bolt.

* * * * *